US006988651B2

(12) United States Patent
Stevenson et al.

(10) Patent No.: US 6,988,651 B2

(45) Date of Patent: Jan. 24, 2006

(54) FRICTION STIR RIVET DRIVE SYSTEM AND STIR RIVETING METHODS

(75) Inventors: Robin Stevenson, Bloomfield, MI (US); Pei-Chung Wang, Troy, MI (US)

(73) Assignee: General Motors Corporation, Detroit, MI (US)

(*) Notice: Subject to any disclaimer, the term of this patent is extended or adjusted under 35 U.S.C. 154(b) by 99 days.

(21) Appl. No.: 10/780,481

(22) Filed: Feb. 17, 2004

(65) Prior Publication Data

US 2005/0178816 A1 Aug. 18, 2005

(51) Int. Cl.
*B23K 20/12* (2006.01)

(52) U.S. Cl. .................................................. 228/112.1

(58) Field of Classification Search ............ 228/112.1, 228/2.1

See application file for complete search history.

(56) References Cited

U.S. PATENT DOCUMENTS 3,780,422 A 12/1973 Herman
5,460,317 A 10/1995 Thomas et al.
6,769,595 B2 * 8/2004 Stol et al. ................ 228/112.1
6,854,634 B2 * 2/2005 Litwinski et al. ........ 228/112.1
6,883,699 B2 * 4/2005 Stevenson et al. ....... 228/112.1
2002/0125297 A1 9/2002 Stol et al.

FOREIGN PATENT DOCUMENTS

GB 2 349 591 A 11/2000

* cited by examiner

*Primary Examiner*—Jonathan Johnson
(74) *Attorney, Agent, or Firm*—Kathryn A. Marra

(57) ABSTRACT

Friction stir fastener equipment and method in which a series of friction stir rivets are rotatably mounted in a supply station and a computer controlled arm terminating in a rotating working head having special gripping jaws that precisely locates and grips a selected rivet. The arm then moves the rotating rivet and progressively drives it into the work until a frictionally heated and plasticized zone of material around the shank of the rivet begins to solidify. The jaws then release the rivet from the drive so that the rivet rotation decelerates to zero. Sufficient hardening of the zone effects the completion of one stir riveting cycle which may be automatically repeated.

5 Claims, 6 Drawing Sheets

FIG - 2A
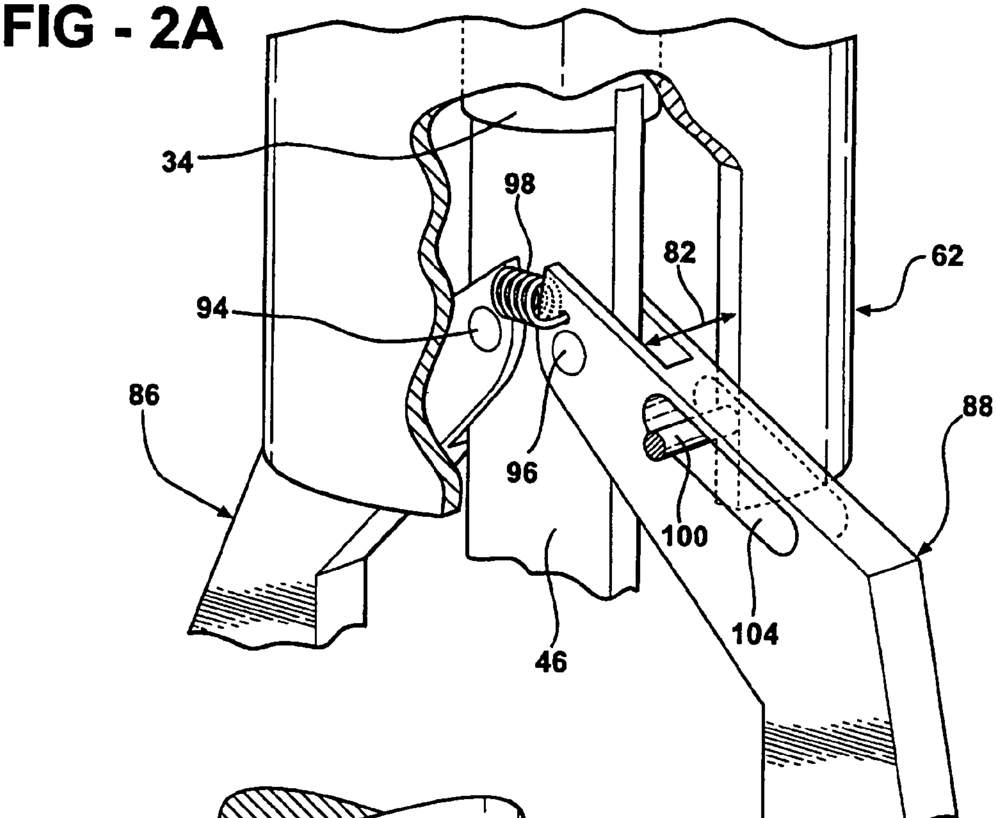
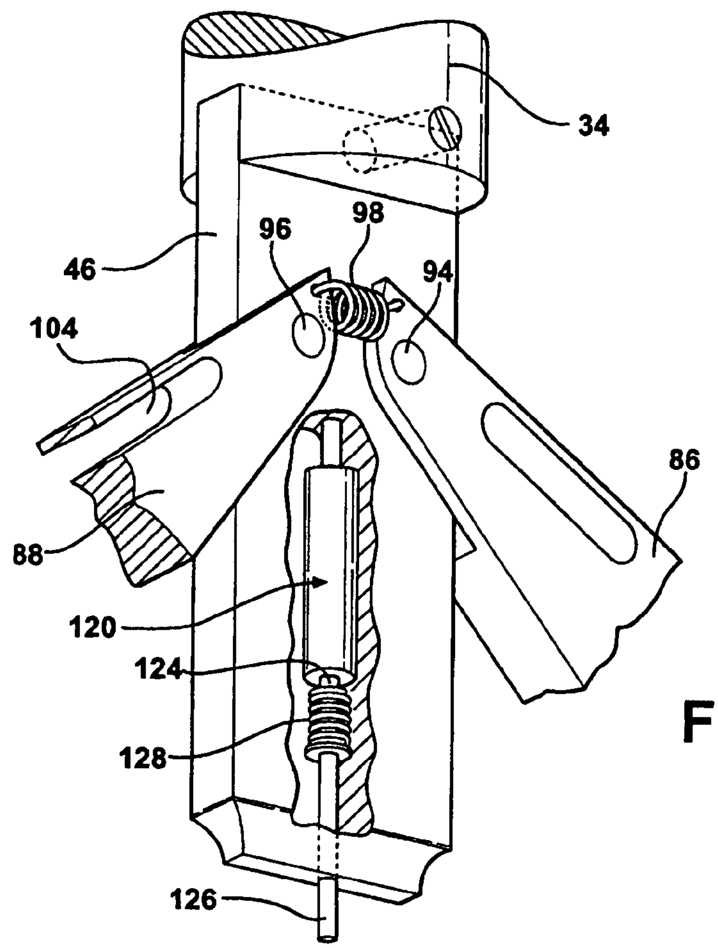
FIG - 2B

FIG - 3
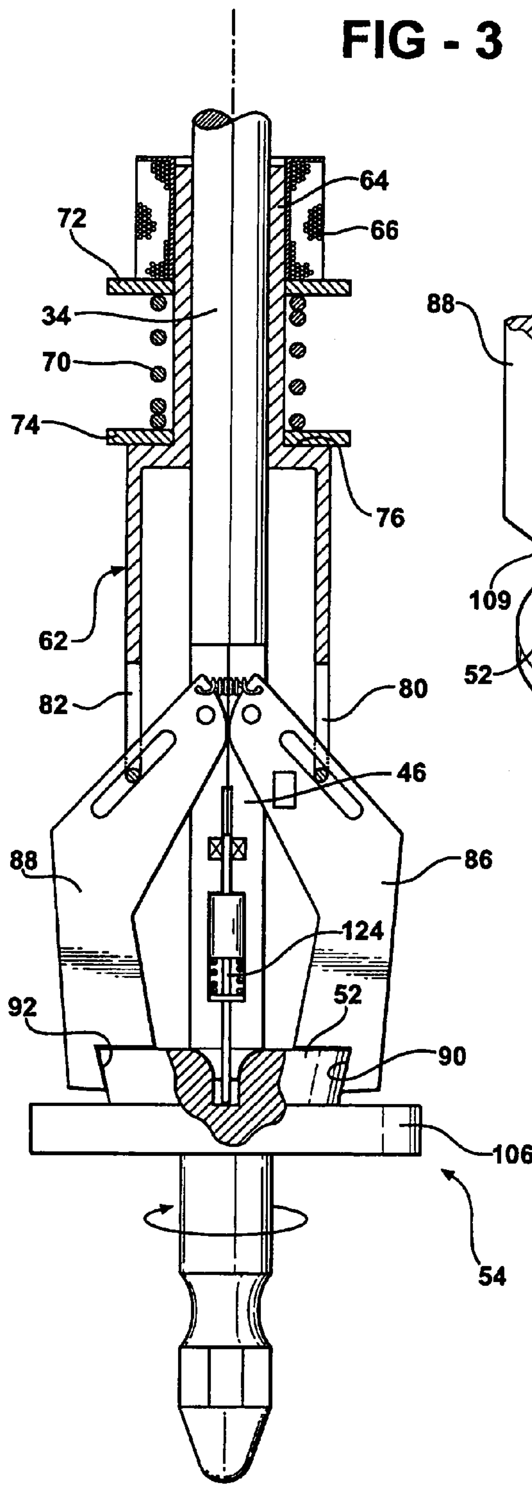
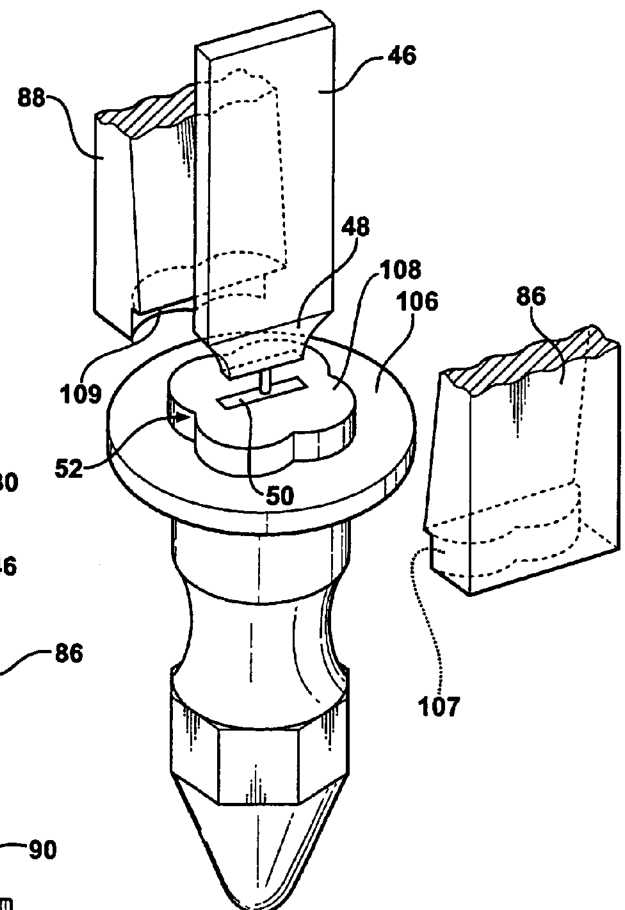
FIG - 3A

FRICTION STIR RIVET DRIVE SYSTEM AND STIR RIVETING METHODS

TECHNICAL FIELD

This invention generally relates to friction stir riveting and more particularly to new and improved friction stir rivet gripping, pickup and drive systems and stir riveting methods. In this invention a rotating driver locates and selectively picks up a friction stir rivet from a carrier and transfers it to a work station and then rotatably drives the rivet into layered work at predetermined rotational speeds and loads to connect the work by friction stir riveting.

BACKGROUND OF THE INVENTION

Friction welding is a known process for joining and repairing parts such as those of iron, aluminum or other suitable metals as well as many plastic materials utilizing the heat of friction to plasticize the interface of relatively rotating components and then allowing the interface to cool and fuse so that the components are metallurgically integrated and securely joined together. In one aspect of friction welding, frequently referenced as friction stir welding, a rotating stir weld tool of temperature stable material is pressed into a joint or seam between abutted parts to be stir welded together. The axially loaded tool is then moved along the joint to effect the localized frictional heating of a strip of materials along the joint including the interface materials sufficient to effect their softening and the metallurgical intermixing. These parts fuse and securely weld together at the seam when the tool is removed and the intermixed material solidifies.

Another aspect of this part joining technique, often termed as friction plunge fastening or friction-stir fastening, can be carried out with the employment of rotating fasteners generically referenced in this application as friction stir rivets to connect overlaying parts. Such rivets, of a temperature stable material generally have enlarged heads with slots or other configurations to drivingly fit with a separate rotatable driver of an installation tool and to accommodate the torque as well as the axial load of the tool. These rivets further have profiled shank portions axially depending from their heads to frictionally engage and then progressively heat and bore into the overlap of the parts being joined.

More particularly, the shanks of these rivet constructions are frictionally introduced into the material of the parts such as at predetermined points on overlapped edge portions and at predetermined ranges of rotational speeds and loads. Frictional heat is generated as the rotating fastener physically works the material of the parts to create a plasticized region of material in the overlap surrounding the rotating shank. The parts are joined on the termination of fastener rotation and frictional heating so that the softened or plasticized material of the parts cools and solidifies around the fastener shank to effect the connection. In some instances diffusion bonding may take place between the outer surfaces of the fastener shank and the material of the joint when the plasticization points of the interfaces of the rivet and that of the parts being connected are metallurgical compatible.

Prior friction-stir fastening do not meet new and higher standards and objectives for machines and methods providing optimal high production rates that feature consistent superior quality friction-stir fastening and joining of parts.

SUMMARY OF THE INVENTION

The present invention relates to new and improved friction-stir welding processes and automated machinery for the optimized high quality friction plunge fastening and optimized rate of joining metal components at an overlap with friction stir fasteners such as rivets. With preferred fastener embodiments and processes of this invention, production is enhanced and optimized with automated tooling repetitively picking up friction-stir rivets from a supply while rotating and positioning such fasteners at predetermined points and effecting plunge riveting under axial load into predetermined points in overlapped sheets or other components to join the work.

More particularly, this invention is directed to new and unobvious improvements in precisioned friction stir riveting and processes in which a rivet is firmly and securely gripped by rotating tooling, transferred to a work station and then axially loaded and rotatably driven into overlaying parts to frictionally heat and plasticize a pocket of material around the shank of the rivet which effectively joins the parts by friction plunge and/or stir joining on solidification of the pocket. Preferably the rotating rivet is freed from the tooling while the material in the pocket is plasticized and then allowed to progressively reach a static state as the plasticized zone between the shank and material solidifies into permanency. In any event, the friction plunge riveting of this invention is accomplished with the continuous dynamic operation of the machine and without significant stoppage of the rotating drive thereof.

Improved rivet drive with faster and more accurate friction plunge riveting with minimized lost parts and scrap are provided by this invention. With this invention a wide range of stir rivet head designs can be readily utilized including those with elongated drive slots or upstanding polygonal protuberances in or on the heads to share input torque for improved stir riveting and to reduce or eliminate metal deformation in the head that might otherwise occur during high torque installations.

BRIEF DESCRIPTION OF THE DRAWINGS

These and other features objects and advantages of this invention will become more apparent from the following detailed description, claims and drawings in which:

FIG. 2*a* is a pictorial view, partly broken away, of a portion of the working head of the machine of FIG. 1;

FIG. 2*b* is a pictorial view, partly broken away, of another portion of the working head of the robotic machine of FIG. 2;

FIG. 3 is a view similar to FIG. 2 showing the tooling with a friction stir rivet aboard;

FIG. 3*a* is a pictorial view of the clamping jaws of FIG. 2 before engaging the head of a stationary rivet;

DESCRIPTION OF THE PREFERRED EMBODIMENT

Figure 1:
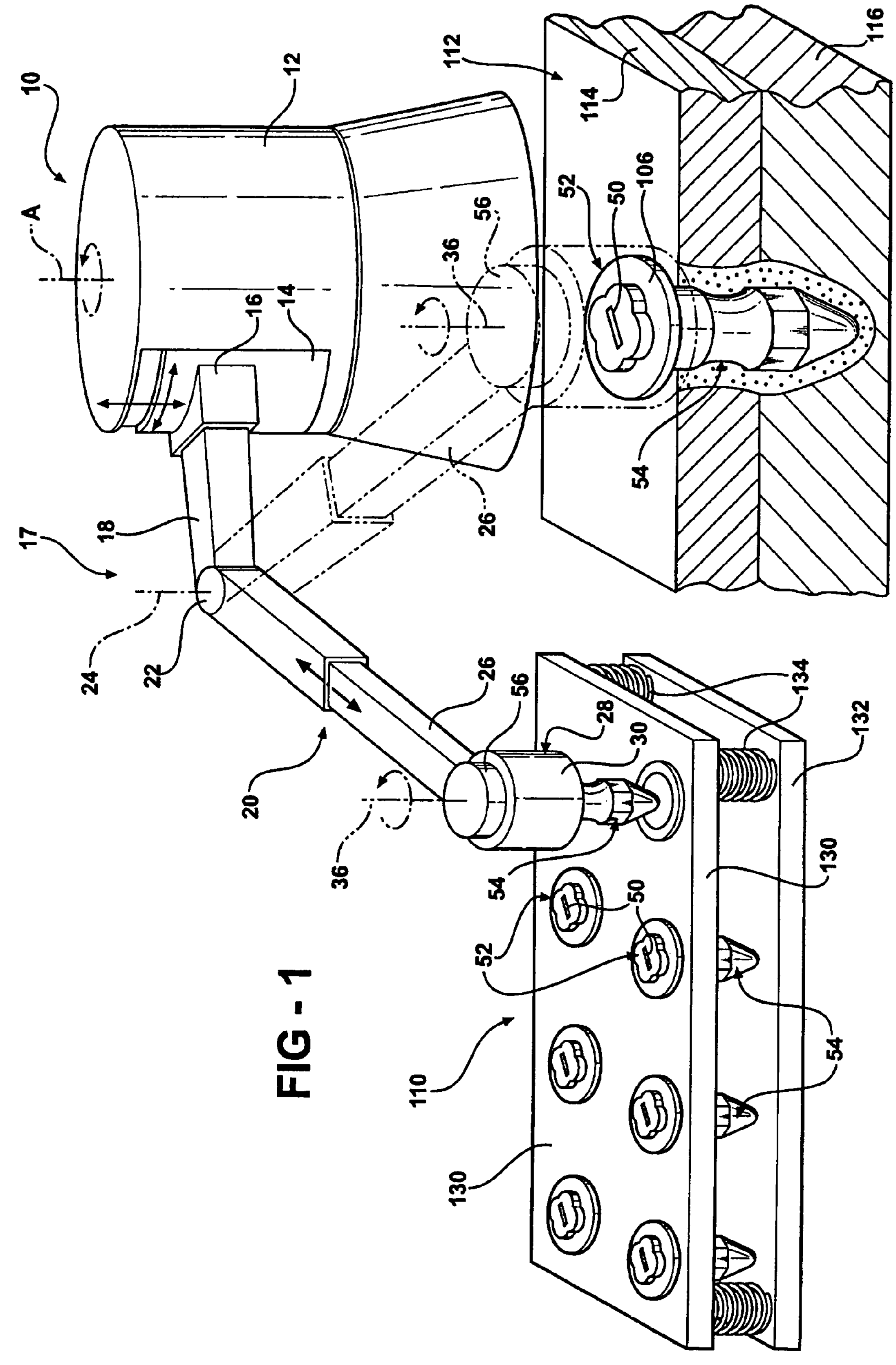
FIG. 1 is a pictorial view of a robotic machine effecting friction stir riveting.

Turning now in greater detail to the drawings there is diagrammatically illustrated in FIG. 1, a manufacturing robot 10 having a main housing structure 12 that is provided with an inner rotor 14 computer controlled and powered for vertical and rotary motion with respect to axis A. The rotor 14 has a radially projecting shoulder 16 that operatively mounts a robot arm 17. The computer controlled robot arm is movable with precision and to an infinite number of programmed positions and comprises a support arm 18 to which a forearm 20 is operatively connected by pivot unit 22 for turning movement about vertical axis 24 thereof. The forearm 20 has a telescopic extension 26 that terminates in a working head 28 having a generally cylindrical housing 30 with a powered fastener gripping jaw unit 32 (FIG. 2) rotatably mounted therein.

Figure 2:
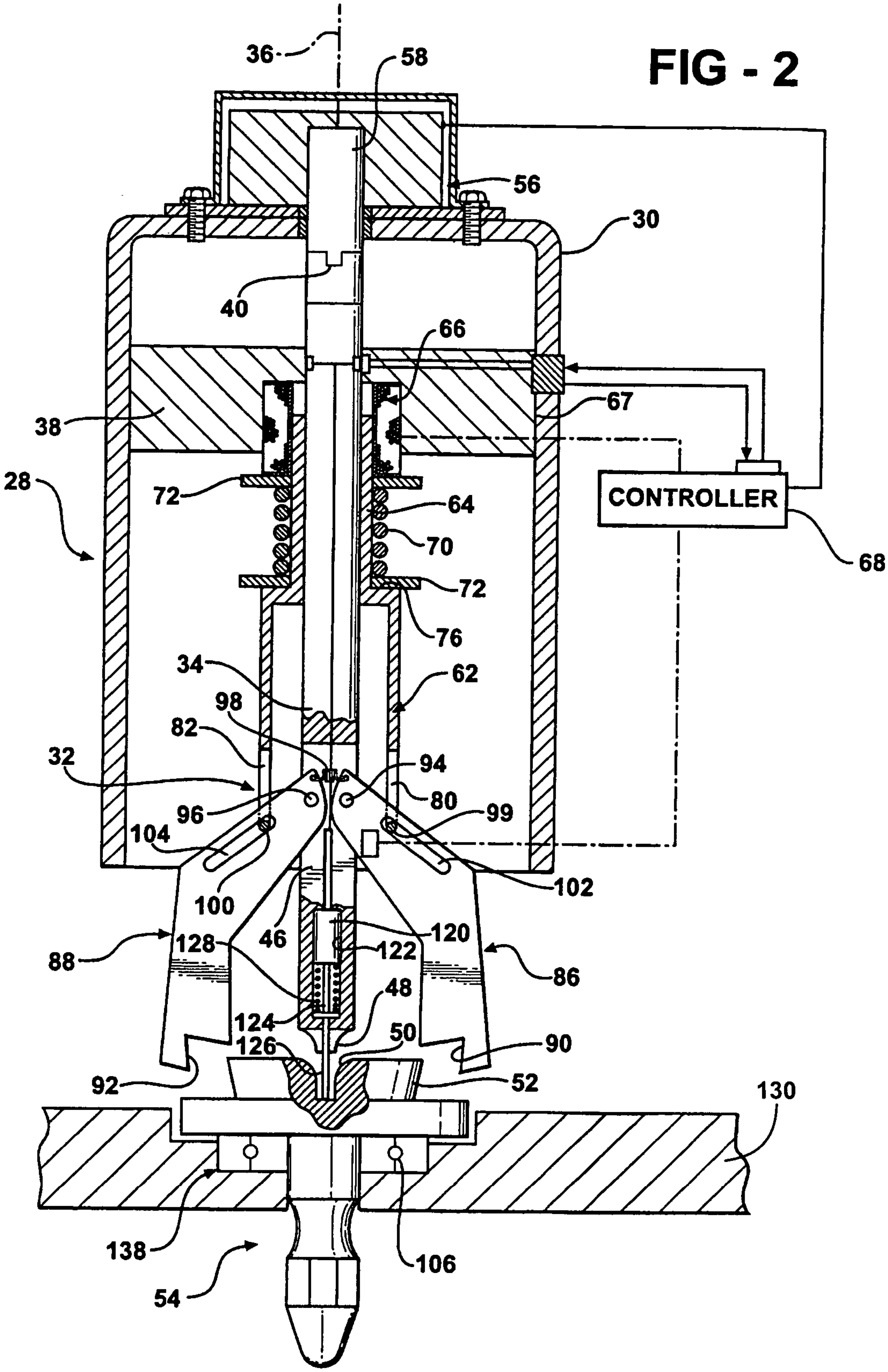
FIG. 2 is a sectional view with some parts in full lines of a portion of the machine of FIG. 1 just before the pick-up of a rivet for the subsequent friction stir riveting of parts.
Figure 4:
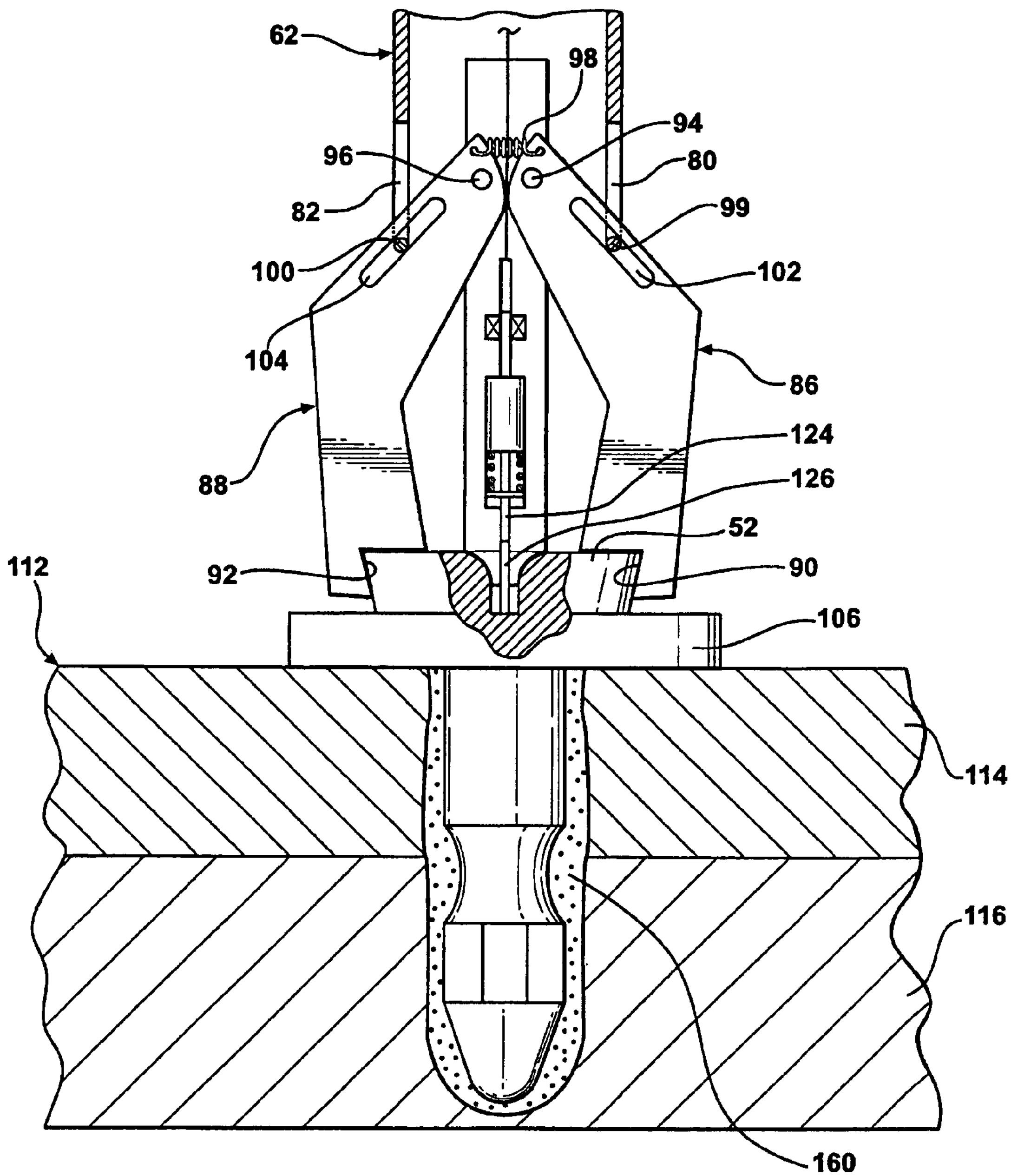
FIG. 4 is a diagrammatic sectional view of a portion of the machine of FIG. 3 effecting the friction stir riveting of overlapping components to one another.

FIG. 2 diagrammatically illustrates the gripping jaw unit 32, comprising an elongated drive shaft 34 operatively mounted for rotation about a centralized vertical axis 36 of the working head by support bracket 38 fixed within the housing 30. The fastener drive shaft 34 extends vertically within the housing from an upper driven end portion 40 to driving connection with an elongated jaw support and driving plate 46 that in effect is a rotatable extension of drive shaft 34. The driving plate 46 is a flattened support member and rivet driving tool keyed or otherwise secured to and driven by shaft 34 which terminates in a screwdriver bit or blade 48 or other suitable shape to drivingly fit into the external drive slot 50 in the head 52 of the stir weld rivet 54. This bit is shown 90 degrees out of position in FIGS. 1, 3 and 4 to illustrate the fit.

Instead of a bit and drive slot drive connection, a socket fixed to plate 48 could be employed to drivingly engage a polygonal drive head projecting upward from the upper surface of rivet head 52.

An electric motor 56, operatively mounted to the top plate of the positional working head 28, has a rotatable output shaft 58 extending there-through that is keyed or otherwise drivingly connected into the upper end portion 40 of the drive shaft 34 for the rotatable drive thereof. The fastener drive shaft 34 operatively mounts a gripping—jaw actuator 62 for triggered back and forth sliding movement thereon. The actuator 62 may be configured as an inverted cylindrical cup with an upstanding annular collar 64 disposed around drive shaft 34 that extends upwardly into an electrically energizable coil or solenoid 66 secured within the housing 30 by the support bracket 38. This coil is electrically energized by operation of a controller 68 mounted to or otherwise associated with the manufacturing robot 12 and is operative to generate a magnetic field that draws the jaw gripping actuator 62 upwardly to the FIG. 2 position to load a helical actuating spring 70. As shown this spring spirals around the actuator collar 64 and is operatively mounted between washer 72 at the lower end of electric coil 66 and the washer 72 mounted on the annular shoulder 76 of the cylindrically shaped and slidable actuator 62. The loaded spring provides the spring force to effect the downward thrusting movement of the actuator and rapid closure of the clamping jaws of this invention for rivet grasping and pickup as will be further explained hereinafter.

The lower end portion of the jaw actuator 62 is formed with vertically extending slots 80, 82 therein that are diametrically opposite one another to accommodate the swinging movements of a pair of opposing jaw arms 86, 88 whose free lower ends define opposing gripping jaws 90, 92 that are adapted to seize and tightly grip the head portion 52 of a selected stir weld rivet 54. As best illustrated in FIGS. 2 and 2*a* the upper ends of the jaw arms are bifurcated to fit around the drive plate 46 so that they can be pivotally connected thereto such as by pivot pins 94 and 96. Helical springs 98 with hooks at opposite ends thereof connect the outer ends of these jaw arms to provide a spring force to urge them toward an open position.

The jaw actuator 62 carries a pair of sliding pins 99, 100 that respectively extend across the mouths of the vertical slots 80, 82 and slidably fit into the downwardly and outwardly inclined camming slots 102, 104 respectively formed into the upper section of the jaw arms 86, 88. As best illustrated in FIGS. 2 and 2*a*, a downward stroke of the actuator 62 under the action of spring 70 causes the slide pins 99, 100 to simultaneously ride downwardly in the camming slots to effect the inward pivoting of the jaw arms 86, 88 on pivots 94, 96 and the closure of the jaws 90, 92 to grip the head portion 52 of the rivet 54.

The head portion 52 of each rivet is relieved to have a lobed configuration somewhat like a four-leaf clover in plan view, flaring upwardly and outwardly from an annular washer—like base 106 to form undercuts as shown best in FIGS. 1–3, 3*a*. Moreover, the top surface 108 of the head portion is flattened except for the centralized driver slot 50 that bisects the clover leaf configuration for receiving the blade or bit 48 of the driver plate 46.

For optimized pick up of the rivets with such multi lobed and undercut configurations and with the bit in operative engagement with the drive slots 50, the jaws are advantageously designed to have interior gripping faces to match and mate with undercut and lobed head portion. With this match up, the bit is positioned relative to the jaws of the jaw unit so that it will be in alignment with the drive slot 50 of the gripped rivet head. Accordingly there is fully engaged on-the-fly rotational pick up, gripping and transfer of a rivet from antifriction rivet support in a supply station 110 to a work station 112. The work station is represented in FIG. 1 by a pair of overlaid sheets 114 and 116 of aluminum alloy or other metal to be joined together by the stir weld rivets 54.

The lobed configuration also augments the drive engagement of the screwdriver bit with the fastener slot and ensures that installation torque is shared by the profile of the head portion of the rivet and the walls defining the slot 50 therein. This is particularly beneficial in high torque situations such as on initial engagement with the work where the slot in the rivet head is otherwise subject to damage.

Position sensing instrumentation can be provided to ensure that the rotatable gripping jaw unit 32 is precisely positioned on the head of a rivet selected for pick-up. Accordingly, a sensor such as a linear variable differential transformer unit (LVDT) 120 may be operatively mounted within a recess 122 within the body of the drive plate 46. The unit is conventional and comprises a main body with an electrically energized main primary coil embraced by a pair of interconnected and oppositely wound secondary coils, not illustrated. These three coils receive an elongated axially movable armature 124 operatively extending therethrough. When the moving armature is centered between the two secondary coils, the voltages induced therein are out of phase with one another and are balanced so that there is zero output voltage. When the movable armature is displaced from the balanced position, increased magnetic flux will couple more effectively into one half of the secondary windings than the other to produce an imbalance in voltage output that is effectively utilized in this invention as an output to trigger jaw closure for quick rivet pick up.

For this action, the armature 124 may be provided with a linear extension or probe 126 which is biased by spring 128 to an extended position in which the armature is centered with respect to the coils of the LVDT unit. Under these balanced conditions the controller 68 is programmed to effect energization of the fixed coil 66 and the resultant upward displacement of the actuator to the FIG. 2 position to load the actuator spring 70 while opening the jaws of the gripping jaw unit 32 so that it is ready to be subsequently triggered for rivet pick up.

In fastener loading operation the working head 28 of the robot arm under control of the computer or controller 68 positions the working head over a targeted one of the rivets 54 in the loading station 110. The head and the housed gripping jaw unit and are moved downwardly for on the fly rivet pick up. As the unit approaches the exposed head portion of the targeted rivet, the extending probe 126 is operative to contact the upper surface thereof and stroke into the body of the LVDT unit which signals the controller to terminate coil energization and trigger actuator release. When this occurs the actuator spring 70 expands and strokes the released actuator 62 downwardly in a snap—action operation to effect rapid closure of the jaws and the drive engagement and clasping of the rivet. The screwdriver bit aligned with the drive slot 50 drivingly engages the slot so that rivet is driven through the dual inputs.

Since the rivets are supplied from the work station 110 and are preferably picked up while the gripping jaw unit is rotating for higher efficiency, they are mounted in predetermined loading positions on a yieldable top carrier plate 130. This plate is a laterally and vertically compliant flattened plate that is supported on a base plate 132 by helical support springs 134 that can provide compliance to the top plate for improved loading of a rivet into the spinning gripping jaws. For instance this spring biased compliance may be beneficial when the rotating gripping jaw unit descends into operating contact with the rivet for pick up that effects some contact and movement of the top plate to allow the gripping jaws to achieve better alignment with the rivet head prior to the gripping operation. Rivet pick up is further enhanced by utilizing antifriction bearings 138 in the top plate to rotatably support and position each of the rivets in predetermined position. With such construction the rivet can freely spin on its axis while it is in its antifriction support and operative engagement with the jaw unit.

In operation, as the working head homes in on the selected rivet, probe 126 which due to spring 128 extends beyond blade or bit 48 contacts the rivet drive slot 50 first. With further advance or the working head 28, probe 126 is forced to retract and blade or bit 48 will interferingly contact slot 50. The tapered sides of slot 50 and the tapered features of bit 48 will interact to apply lateral force on rivet 54 which will deflect compliant carrier plate 130 to fully align blade 48 with slot 50 so that blade 48 and slot 50 engage fully, simultaneously retracting probe 126 fully into blade 48. When the LVDT signal indicates that probe 126 is fully retracted, the rotating bit and jaws drivingly engage the rivet which is instantaneously driven at the rotational speed of the gripping jaw unit with minimized frictional drag or resistance. Moreover, no appreciable frictional drag is experienced because of the compliance of the top carrier plate 130 and the antifriction bearings 138.

The robot arm then rapidly picks up and moves the spinning rivet to the work station and then downwardly into frictional contact with the overlaid sheets under axial load provided by the robot arm. This effects the progressive and localized softening of the material of the sheets in a pocket formed around the shank for the friction stir welding of the rivet into a predetermined point into the overlaid sheets. This plasticized zone is illustrated by the stippled pocket 160. The plasticized zone of material solidifies on release of the gripping jaws from the head of the rivet by the energization of the coil 66 and the resulting upwardly movement of the actuator and the simultaneously upward movement of the working head of the robot and the driver bit from the slot 50 as mandated by the controlling computer. The residual material in the plasticized zone conforms and hardens to the profile of the rivet, the two plates 114 and 116 are secured together.

Duration of the friction stir riveting cycle may determined by monitoring the power consumption of motor 56. Before rivet 50 engages the upper surface of work-piece or plate 114 (FIG. 1) the motor power will be low. Upon first contact between rivet 50 and work-piece 114 the motor power will abruptly increase thereby signaling controller 68 that the friction stir riveting process has initiated. Motor power will remain at or about this level during the initial stir riveting of workpiece 114 and 116. While progress of the riveting process may be inferred from the robot-actuated motion of working head 28 into the work pieces. The accuracy of this approach may be compromised since work pieces 114, 116 are compliant so that only a portion of the working head 28 motion results in relative motion between the rivet and workpieces 114 and 116.

A more robust approach is to take advantage of the second abrupt increase in motor power occasioned when the underside of rivet head 106 contacts the upper surface of workpiece 114. This occurs because head 106 has a larger contact area than the rivet shank body. Since the rivet dimensions are known, the known displacement of working head 28 can be compared with the relative motion of the rivet and workpieces. From this data two strategies can be used. The simplest is to ratio the working head displacement with the relative rivet workpiece displacement (Ratio 1) and generate any subsequent desired rivet-workpiece displacement by multiplying the desired rivet-workpiece displacement by this ratio to compute the appropriate commanded working head displacement and terminate the riveting process when this displacement has been achieved.

For most applications this approach will be adequate and very satisfactory. However a more accurate approach would be to modify this ratio to take account of the additional thrust forces to be expected in the terminal stages of rivet insertion as penetration the small diameter rivet shank is supplanted by penetration of the large diameter rivet cap.

Under the assumption that thrust force is proportional to motor power and the assumption that the system stiffness is constant a new ratio (Ratio 2) which accounts for the increased terminal thrust force can be calculated from:

$$\text{Ratio } 2 = 1 + (\text{Ratio } 1 - 1) \times \frac{\{\text{Motor Power for Cap Penetration}\}}{\{\text{Motor Power for Shank Penetration}\}}$$

Then the commanded additional working head displacement will be given by:

Commanded Additional Working Head Displacement=Ratio 2×Desired Additional Rivet Penetration.

As before, the rivet will be released by a command from the controller when the additional working head displacement is achieved.

In any event, after such stir rivet fastening, the robot arm can then automatically move to the fastener loading position for a recycling operation in which another rivet is targeted and picked up by the rotating gripping jaws and then moved back to the working station for another friction stir riveting operation. With this controlled and precision friction stir riveting there is improved riveting consistency with each fastening being substantially the same.

Figure 5:
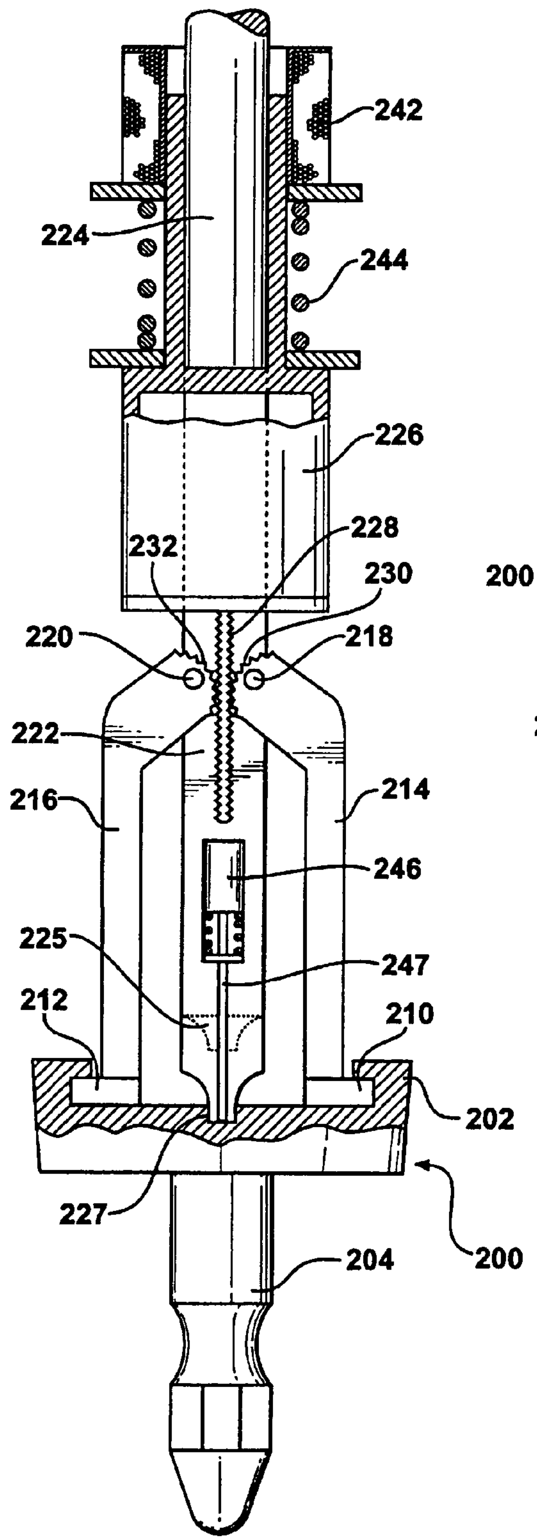
FIG. 5 is a view similar to view of FIG. 2 illustrating another embodiment of the invention.
Figure 5A:
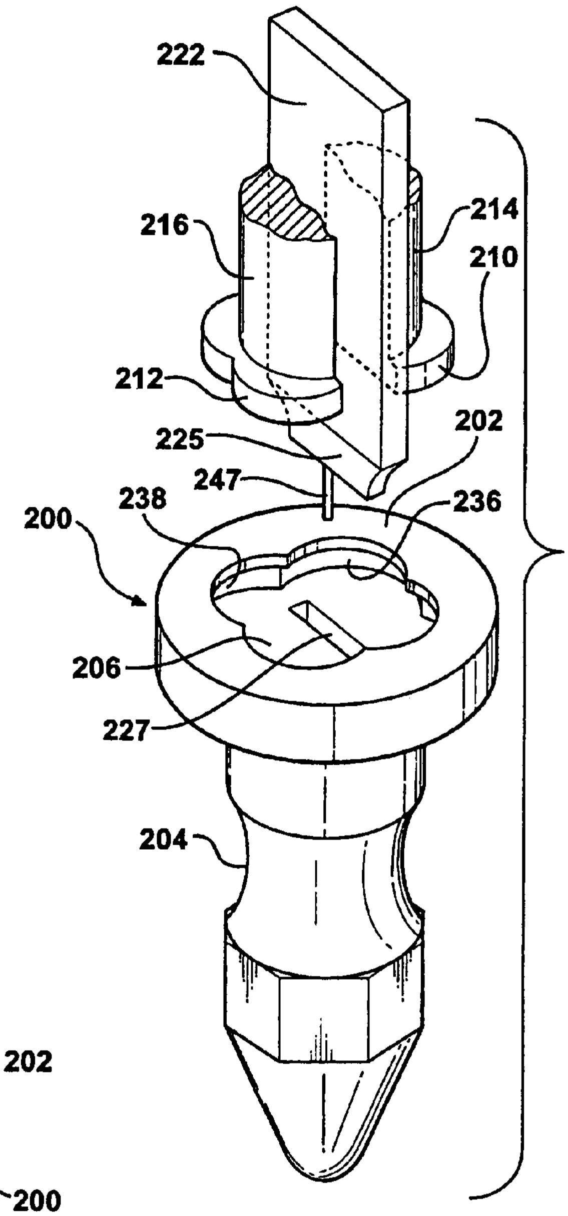
FIG. 5*a* is a pictorial view illustrating some details of the rivet and retainer jaws of the tooling of FIG. 5.

FIGS. 5 and 5*a* illustrate another embodiment of this invention, similar to that of FIGS. 1–4, but advantageously utilizes centrifugal forces developed in the spinning jaws of the working head of the manufacturing robot for the pick-up and drive of the friction stir rivets. Moreover in this embodiment a manufacturing robot and its robot arm and working head employed and other components are basically the same as described in connection with the first embodiment.

In the embodiment of FIGS. 5, 5*a* developed centrifugals are advantageously utilized to improve operation. For example, each stir rivet 200 is formed with an enlarged cylindrical head 202 and a smaller diameter profiled shank 204 extending therefrom. While the shank may be configured the same as that of the rivet of FIGS. 1–4, the head 202 thereof is materially different, being hollowed out to form a retention cavity 206 with an upper access opening through the top wall thereof which can receive the gripping jaws 210, 212 formed at the ends of jaw arms 214, 216. These jaw arms are pivotally mounted by pivot pins 218, 220 to the flattened drive plate 222 having its upper end keyed into the end of the drive shaft 224 for rotation therewith. The drive plate 222 terminates at its lower end in a screw driver bit 225 adapted to operatively engage the corresponding linear drive slot 227 formed in the flattened interior face or inner surface of the cavity 206. The drive shaft 224 slidably mounts a jaw actuator 226 which is generally similar in structure and operation to corresponding components in the first embodiment.

The jaw actuator 226 however carries an elongated depending rack structure 228 which extends between and operatively meshes with the teeth of opposing sector gears 230, 232 formed in the facing circular ends of the jaw arms 214 and 216. Downward linear movement of the rack simultaneously turns each of the jaw arms 214, 216 in outward opposite directions and away from one another on pivots 218 and 220 so that the gripping jaws 210, 212 when positioned within the cavity 206 will operatively engage the head of the rivet for rivet pick up and rotational drive thereof. The upward movement of the rack causes the arm to swing into a side by side orientation so that the gripping jaws thereof can be inserted into or withdrawn from the cavity 206 in the head 202.

The convexly curved gripping jaws 210, 212 have a lobed clover leaf configuration for the driving engagement with the corresponding concavely curved drive surfaces 236, 238 on the radial wall of the recess. The coil 242, helical spring 244 and the sensor 246 and armature or probe 247 correspond in construction and operation to those of the first embodiment. The drive shaft 224 also corresponds the drive shaft of the first embodiment and is driven by an electric motor mounted to the end of the working arm of a robot, which may be the same as robot 10 of the first embodiment. When the jaws are expanded into the rivet drive position of FIG. 5, the top wall of the rivet head 202 extending outwardly from the access opening 208 therein may contact the upper surfaces of the jaws to facilitate retention of the rivet in the gripping jaw unit. Additionally the lobes of the jaws 210, 212 are further maintained in the expanded drive position by centrifugal forces developed in the rotating unit.

In this embodiment the rivets 200 will preferably be mounted in a compliant supply plate and in anti-friction bearings as in the first embodiment so that the robot arm can repetitively target and pick up rivets without loss or damage as they are used in the stir or plunge riveting according to this invention to secure the work sheets to one another.

Moreover in this embodiment the solenoid 242 is energized to attract the actuator and move it upwardly to turn the jaw arms inwardly by interaction of the rack and pinion gearing while loading spring 244. With the gripping jaws maintained in a close side-by-side position, jaw ingress and egress with respect to the cavity in rivet head 202 is readily accomplished as needed. When the end of the extending probe 247 contacts the bottom surface of the cavity and preferably the bottom of the screw driver slot 227, it strokes inwardly causing the associated sensor 246 to signal the controller which deenergizes of the electric coil 242. With the coil deenergized the spring 244 strokes the actuator and the depending rack downwardly. This action turns the jaw arms outwardly by action of the sector and pinion gearing so that the drive lobes of the jaws 210 and 212 drivingly engage the corresponding concave drive surfaces 236,238 forming the peripheral extent of the cavity in the head of the rivet. With this engagement the screw driver blade aligns and engages the slot 227 so that the drive engagement of the head of the rivet is completed. The centrifugal forces developed in the spinning jaws further maintain the jaws in driving contact with the interior surfaces in the rivet head during rotational drive and pick up of the targeted rivet.

After pick-up, the spinning rivet is quickly and precisely moved to a work station wherein it is employed to join work sheets together as in the first embodiment. Moreover, as the plunge riveting reaches completion, the coil 242 is automatically energized so that the actuator will be pulled upwardly to again turn the jaw arms inwardly and the jaws away form the radial drive surfaces of the cavity. On such jaw closure, the robot arm moves upwardly so that the screwdriver bit 225 disengages from the drive slot 227 as the plasticized zone around the shank of the rivet solidifies.

The robot arm then cycles back to the supply so that the continuously spinning jaws pick up another targeted rivet to effect another plunge riveting in repetitive fashion.

While preferred embodiments and methods concerning this invention have been shown and described to illustrate this invention and the concepts thereof other related embodiments and methods will now be readily apparent to those skilled in the art. Accordingly the scope of this invention is not limited to such preferred embodiments and methods but by the following claims:

The invention claimed is:

1. A method of friction plunge riveting work parts together with friction stir rivets each having an upper drive head and a shank portion depending therefrom comprising the steps of mounting said rivets in rest positions in a support defining a supply station so that the heads thereof are externally accessible and the shank portions thereof rotatably mount into the support, moving a rotating rivet gripping and installation tool from a start position into operative drive engagement with said head portion of a selected one of said rivets for rotating said selected rivet in said support, operating said tool for removing said selected rivet from said support while continuously rotating said selected rivet, subsequently moving said selected rivet to a work station and into frictional engagement with said work parts to effect the penetration of said work parts with the shank portion thereof by frictional heating and plasticizing of a zone of material therein that extends around said shank portion penetrating said work parts, and releasing said selected rivet from said tool while said tool is rotating and allowing said rivet to diminish in rotational speed to zero while said material of said plasticized zone solidifies around said shank to complete the friction plunge riveting of said work parts together with said selected rivet.

2. The method of friction stir riveting of claim 1 and then further comprising the step of moving said rotating rivet gripping and installation tool back to said supply station and into operative drive engagement with another selected one of said rivets to initiate another friction plunge riveting of said work parts together.

3. A method of friction stir riveting overlapping metal parts together at a work station with friction stir rivets each having a drive head and a said shank portion depending therefrom comprising the steps of mounting a plurality of friction stir rivets in rest positions for subsequent rotation and pickup with respect to a support defining a supply station so that the heads thereof are externally accessible and the shank portions thereof depending therefrom rotatably mount into said support, moving a rotating rivet gripping and apply tool from a start position into operative engagement with the head portion of a selected one of said rivets to grip and rotate said selected rivet while in said supply station, operating said rotating rivet gripping and apply tool to move said selected rivet to said work station so that the shank portion thereof is in loaded frictional contact with the upper surface of said overlapping metal parts at said work station, continuing the rotation of said rivet under load to effect the penetration of said shank portion of said rivet into said parts effecting limited plasticizing of material thereof in a frictionally heated zone extending around said shank portion and releasing said rivet from said rotating gripping and apply tool to allow said rivet to diminish in rotational speed to zero and said plasticized material to fully solidify around said shank of said rivet so that said parts are securely friction stir riveted together.

4. The method set forth in claim 3 and further comprising the step of automatically cycling said tool from said work station back to said supply station while said tool is rotating to target rotate and pick up a second rivet therefrom and cycling said rotating tool with said second rivet aboard back to said work station and into loaded frictional contact with said overlapped parts for the joining of said parts with said second rivet by friction stir riveting.

5. The method set forth in claim 3 wherein said application tool has opposing jaws movable between open head receiving and closed head gripping positions, each of said rivets have profiled heads and a centered drive and shaped drive associated therewith, and wherein said application tool has a depending driver rotatable therewith and terminating in a driving end for operatively engaging said centered and shaped drive and further comprising the step of rotatable driving said rivet from shared input torque from said driving end and from said opposing jaws of said gripping application tool.

* * * * *